United States Patent [19]
Wörner et al.

[11] Patent Number: 5,199,537
[45] Date of Patent: Apr. 6, 1993

[54] ABUTMENT WITH A DAMPING DEVICE

[75] Inventors: Helmut Wörner, Justinus Kerner Str. 23, D-7306 Dendendorf; Sebastian Unterhuber, Denkendorf, both of Fed. Rep. of Germany

[73] Assignee: Helmut Worner, Denkendorf, Fed. Rep. of Germany

[21] Appl. No.: 790,278

[22] Filed: Nov. 7, 1991

[30] Foreign Application Priority Data

Nov. 7, 1990 [DE] Fed. Rep. of Germany ....... 4035286
Nov. 23, 1990 [DE] Fed. Rep. of Germany ....... 9015950

[51] Int. Cl.$^5$ .................... B23Q 5/52; B65G 47/88; F15B 15/22; F16F 9/49
[52] U.S. Cl. .................................. 188/266; 188/382; 188/311
[58] Field of Search .............. 188/382, 266, 311, 279; 267/182; 198/633, 367, 459, 460, 463.4; 193/35 A, 40, 32

[56] References Cited

U.S. PATENT DOCUMENTS

| | | | |
|---|---|---|---|
| 3,360,079 | 12/1967 | Van Deberg | 193/32 X |
| 3,970,180 | 7/1976 | Schlottmann et al. | 193/35 A |
| 4,310,073 | 1/1982 | Haring | 193/40 X |
| 4,397,386 | 8/1983 | Kampf | 193/32 X |
| 4,641,738 | 2/1987 | Cedrone et al. | 193/40 |
| 4,754,866 | 7/1988 | Billington et al. | 193/40 X |

FOREIGN PATENT DOCUMENTS 3740669 6/1989 Fed. Rep. of Germany.
3806436 9/1989 Fed. Rep. of Germany.

Primary Examiner—Douglas C. Butler
Attorney, Agent, or Firm—Browdy and Neimark

[57] ABSTRACT

An abutment with a damping device, more particularly for automatic machining or conveying equipment, comprising an abutment member which is able to be moved from a first abutment position as far as second end abutment position while subjected to a damping action. A fluid power operated setting member can move the damping device (which is connected with the abutment member) perpendicularly to the direction of the abutment action and is able then to move the abutment out of an abutment plane and back into it. The damping device has in this case at least one damping piston adapted to run in at least one damping cylinder, there being a choke device which damps the piston movement and provides resistance for the ingoing or outgoing air during piston movement. Both the setting member and also the damping device operate by a fluid power effect, individual adaptation of the damping properties being possible for workpieces with different masses and/or different speeds of movement.

34 Claims, 4 Drawing Sheets

ABUTMENT WITH A DAMPING DEVICE

BACKGROUND OF THE INVENTION

The invention relates to an abutment with a damping device, more particularly for automatic machining or conveying equipment, comprising an abutment member which is able to be moved from a first abutment position as far as a second end abutment position while subjected to a damping action, a setting member which is able to be moved by fluid power and is adapted to move the damping device connected with the abutment member perpendicularly to the direction of abutment and to move the abutment member out of an abutment plane and then back into it, and return means for the return of the abutment member from the end abutment position into the first abutment position.

Such an abutment with a damping device is for instance described in the German patent 3,629,914 or the German patent publication 3,806,436 A. In order to provide for damped movement of the abutment member the damping device in these cases has a frictional layer which may be thrust against the abutment member with the desired degree of force by an adjustment device in order to provide for an adaptation to workpieces, palettes, parts of machines and the like, traveling at different speeds and having different masses. Thus if the setting of the damping action were not to be sufficient, the abutment member would reach the end abutment at an excessive speed with such an impetus as to produce an undesired jolting and vibration of the abutting means. On the other hand an excessive damping action would lead to the danger that the abutting device would not reach the end abutment position and would therefore assume an incorrect end abutment position, something likely to lead to undesired and faulty action on the part of, for instance, machine operations or robotized handling sequences. The known devices are consequently hardly well suited for equipment in which they have to damp objects at greatly differing speeds and/or objects with greatly differing masses to ensure that the objects arrive in the desired abutment position. Since in practice the thrust of the frictional elements is not able to be adapted to the different operational conditions, the known abutments are only suitable for equipment, in the case of which the abutting objects always move in a certain speed range or always have in a certain weight range. In fact, the first adjustment of the damping action and even more so an adaptation to modified conditions is often difficult and troublesome to perform.

SHORT SUMMARY OF THE PRESENT INVENTION

Accordingly one object of the invention is to provide an abutment of the type initially mentioned in the case of which the adjustment of the damping action is unnecessary. A still further object of the present invention is to provide such a system suitable as an abutment for equipment with different masses and/or different speeds.

In order to achieve this or other objects appearing from the present specification, claims and drawings, the damping device has at least one damping piston adapted to move in at least one damping cylinder, there being a choke device constituting a resistance to flow of air leaving or entering the cylinder when the piston is moved.

Owing to the pneumatic device an adaptation and adjustment to suit different masses and/or different speeds within wide limits is no longer necessary, since the damping piston is in any case-even if only a very small force is acting-definitively thrust into its end position, since the air in the damping cylinder may escape through the choke device even if the force is very small. Thus different masses and/or different speeds of the abutting objects will only lead to a shorter or longer time elapsing before reaching the end abutment. The damping device may hence in principle be designed for high speeds or large masses and will nevertheless make certain that the end abutment position is reached. Owing to the seals, which are present in any case, of the piston and cylinder unit it is unnecessary to provide an additional boot seal and the absence of such boot will not mean that dirt particles will influence the damping properties.

In the case of a design for very large masses to be damped while still having a low overall height at least two or more damping cylinders connected in parallel are provided positioned side by side. The width of the arrangement is in the case of conventional conveying equipment generally of little importance. In this respect it is an advantage to employ two damping cylinders pivotally arranged on both sides of a housing containing the setting member so that all in all only one single setting member is necessary and the overall height is further reduced by the fact that in the vertical direction the setting member overlaps the damping cylinders.

The return means are preferably in the form of a fluid power pressure duct opening into the damping cylinder and returning the damping piston when pressure is applied, since the setting member driving the abutment member is in any event operated by fluid power and for this reason no additional fluid power connection is necessary. A return spring is not necessary for the abutment member.

Furthermore it is an advantage if the setting member has a setting piston able to be moved in the cylinder space of a housing and which is connected with the cylinder of the damping device via a connecting element, the setting piston being designed in the form of a pilot or drive piston for the returning pressure duct. This setting piston is consequently responsible not only for the displacement of the abutment member out of an abutment plane and back into the same but additionally controls the return of the abutment member into the first abutment position when the abutment member is moved out of the abutment plane.

Furthermore it is an advantage if the setting piston has a return spring so that if the pressure is turned off the abutment member is automatically moved back into the abutment plane.

The return pressure duct preferably opens laterally into the cylinder space so that as from a certain position of displacement of the setting position it is automatically acted upon by the fluid power pressure. This pressure duct then extends at least partly through the housing and is connected via a flexible or piston-like or shaft-like part of the pressure duct with the pressure duct in the damping cylinder. The design in the form of a piston-like part pressure duct, which is connected with the housing or the damping cylinder and fits in a sealing or shifting manner in a cylinder-like recess in the respectively other part—that is to say the damping cylinder or the housing—constitutes a particularly advantageous and compact arrangement, which furthermore provides a means preventing twisting of the damping cylinder.

In the arrangement with damping cylinders positioned pivotally on either side of a housing comprising the setting member it is an advantage if the shaft-like part of the pressure duct is constituted by a pivoting bearing shaft for the two lateral damping cylinders. This means that the pivoting bearing shaft, which in any event can withstand substantial abutment forces, is able to be additionally used as a pressure duct permitting a relative movement.

In the return pressure duct, and more particularly in the piston-like pressure duct part, a check valve permitting flow of the fluid in only one direction to the damping cylinder is present. This prevents air being forced by the damping piston into the pressure duct or into the cylinder space in the housing.

The choke device is preferably arranged in the end part of the damping cylinder, which is abutted by the damping piston in the end abutment position thereof.

In order to set the desired or necessary damping properties or to automatically preset them, the choke device has pressure-dependent choke settings. Thus more particularly the choke device may comprise a first choke having a first choke opening, which has a bypass duct opening briefly in the event of there being a pressure surge, with a second, larger choke opening. This means that if for instance a workpiece strikes the abutment member a first impact will be deadened by the larger choke opening, which automatically shuts and then a stronger damping effect may be produced by the first choke opening.

In a preferred design of the choke in a passage through the first choke, a choke element having a constant orifice is provided which is positioned between two elastic seals and has a smaller external diameter than the passage, the bypass passage being provided outside the seal which is remote from the damping piston, and is able to be deformed by a pressure surge and then overrides the sealing connection between the choke element and the other seal. In this case the choke element is preferably in the form of a centrally perforated disk. The first choke which is switched over automatically and in a way dependent on the pressure may be then in the form of simple components able to be produced at a low price.

In order to be able to set the properties of the choke, as for instance for adaptation to suit very different ranges of the abutment force, the first choke preferably has a setting element which is able to be screwed inwards and outwards to vary the axial play for the two elastic seals and the setting element setting the choke element.

In order to avoid excessively slow movement of the damping piston the choke device best comprises a further choke, which has a choke element which is acted upon by the thrust of the damping cylinder, is able to be shifted against the force of a spring and runs a cylinder, which element in its terminal position in which it reaches at the maximum spring loading effect, shuts off a choke passage in a sealing manner, there being a clearance between the choke element and the cylinder wall and/or the passage opening.

In order to avoid noise the choke device is provided with a silencer. The latter may advantageously be integrated in the choke device.

Two working embodiments of the invention will now be described in the following account with reference to the accompanying figures.

LIST OF THE SEVERAL VIEWS OF THE DRAWINGS.

DETAILED ACCOUNT OF WORKING EMBODIMENTS OF THE INVENTION.

Figure 1:
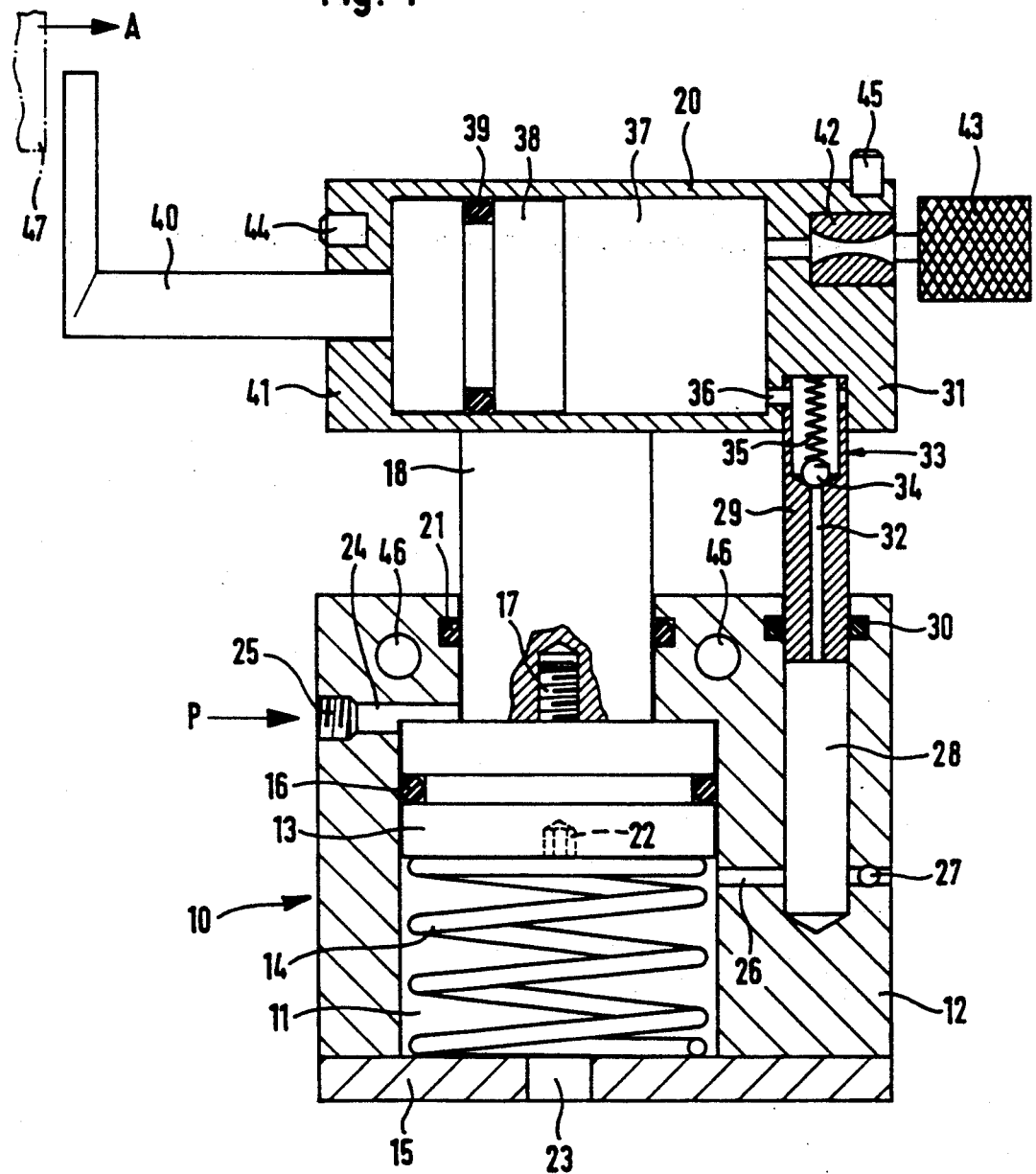
FIG. 1 shows a first working embodiment of the abutment in a vertical sectional view.

In the case of the first working embodiment of the invention illustrated in FIG. 1 of an abutment with a damping device, a pneumatic setting member 10 has a setting piston 13 running in a cylinder space 11 within a housing 12. This setting piston 13 is urged by means of a helical spring 14, which is arranged between the its lower end surface and a lower housing cover 15, into its upper end position. The setting piston 13 runs along the wall of the cylinder space 11 and it has a piston seal 16 making sealing contact with the wall. A screw 17 which is arranged centrally on the upper end surface of the setting piston 13 is screwed to a generously dimensioned piston rod 18, which extends through the upper wall of the housing 12 and has its free upper end secured to a damping cylinder 20. A seal 21 in the upper housing wall makes sealing contact with the piston rod 18. In order to screw the setting piston 13 to the piston rod 18 the setting piston 13 has a central screw opening 22 in its lower end surface, a corresponding hole 23 in the housing cover 15 (which shuts off the housing 12 from below) permitting access to the screw opening 22.

It is obviously possible for the setting piston 13 to be connected with the damping cylinder 20 via the piston rod 18 in some other way, for instance as an alternative or additionally it is possible as well for there to be a screw connection means between the damping cylinder 20 and the piston rod 18, and the setting piston 18 may be secured to the piston rod in some other manner, for instance by an integral construction, by welding or a press fit.

A first pressure duct 24, which is subjected to a pneumatic drive pressure P, extends through a lateral wall of the housing 12 and opens at the upper edge or, respectively, at the upper end surface of the setting piston 13. A screw connection 25 renders it possible in this respect to connect up an external pressure duct.

About half way up the cylinder space 11 there extends a second pressure duct 26 between the cylinder space 11 and the outer surface of the housing 12 where it is sealed off by a sealing element 27. A third cylindrical pressure duct 28 extends from the second pressure duct 26 vertically upwards as far as the outer side of the housing. From the damping cylinder 20 a fourth pressure duct 29, which is designed in the form of a piston, extends downwards and in a sealing manner into the third pressure duct 28. In order to provide a sealing guiding action there is in this case a seal 30 fitting around the fourth pressure duct 29.

The fourth piston-like pressure duct 29 is secured in a right end wall 31 of the horizontally arranged damping cylinder 20, for instance by screwing, welding, adhesive bonding, soldering, brazing, press fitting or the like. A longitudinal hole 32 extending through the fourth pressure duct 29 widens out in the upper end part to constitute the valve chamber of a check valve 33 since a spherical valve member 34 is urged by means of a spring 35 against the longitudinal hole 32 in a sealing manner. The check valve 33 is connected via a pressure duct 36 with a space 37 of the damping cylinder 20, in which a damping piston 38 runs and is sealed off by the intermediary of a piston seal 39 running on the wall of the cylinder space 37.

In place of the piston-like pressure duct 29 and the cylinder-like pressure duct 28, which are able to telescope, it is possible for the damping cylinder 20 to be connected with the cylinder space 11 or respectively, with the second pressure duct 26 for instance by means of a flexible pressure duct. The check valve 33 may be positioned in this flexible pressure duct, however in the right end wall 31 or respectively, in the housing 12.

An L-like abutment member 40 is provided on the damping piston 38 and extends through a cylinder cover 41, which closes the cylinder space 37 on the left side, the bent limb of the abutment member extending upwards. In FIG. 1 the first abutment position of the damping piston 38 and respectively, of the abutment member 40 is shown, in which the damping piston 38 contacts the cylinder cover 41.

In the right end wall 31 of the damping cylinder 20 a choke device 42, which is only diagrammatically illustrated, is arranged which connects the cylinder space 37 with an externally mounted silencer 43 and via the same with the outside atmosphere.

In the cylinder cover 41 a first position sensor 44 is arranged in order to detect the approach of the bent part of the abutment member 40 while in the right end wall 31 a second, upwardly pointing position sensor 45 is set or is mounted thereon, which detects the passage of a workpiece.

In the housing 12 attachment holes 46 are provided for mounting on a machine or on an item of conveying equipment.

The manner of operation of the abutment illustrated in FIG. 1 resides in that a workpiece 47, which comes from the left and is as shown in broken lines—possibly in the form of a part of a machine or the like—firstly assumes the first abutment position of the abutment member 40 so that the same pushes the damping piston 38 into the cylinder space 37. The displaced air has to escape via the choke device 42, the silencer 43 preventing any noise more particularly in the case of a violent impact of the workpiece 47. Owing to the check valve 33 escape of the air into the housing 12 is impossible. The choke device 42 consequently means that the movement of the workpiece 47 is damped and retarded so that it reaches the terminal abutment position smoothly in which the damping piston 38 abuts the right end wall 31. Owing to the sensor 44 then reaching of this position is detected and a corresponding signal is fed to a control device, not illustrated.

If now the workpiece 47 is to continue its movement in the direction A, the first pressure duct 24 is put under a pressure P. The result of this is that the setting piston 13 is moved against the force of the helical spring 14 downwards and by the intermediary of the piston rod 18 it draws the damping cylinder 20 and consequently the abutment member 40 downwards as well. The workpiece 47 is able to continue its movement.

When the upper edge of the setting piston 13 reaches the position of the second pressure duct 26, the latter is also subjected to the pressure P so that compressed air is able to flow through the pressure ducts 28, 29 and 36 to the cylinder space 37. The check valve 33 opens in this case automatically. Therefore the damping piston 38 is returned into the first abutment thereof.

When the workpiece has reached the second position sensor 45 or has moved past the same, it is possible for the pressure P to be turned off by the control device, not illustrated, so that the setting piston 13 is returned by the force of the helical spring 17 back into the illustrated position thereof.

As a possible modification of the embodiment of the invention it is possible for the damping piston 38 to have an additional axial guide, which extends in a sealing manner through the right end wall 31 of the damping cylinder 20. The configuration of the abutment member 40 may be varied and it is only significant that one part extends upwards past the damping cylinder 20 outwards.

For the vertical guiding of the damping cylinder 20 on the housing 12 it is possible to have additional vertical guides if necessary. For instance it is also possible for the damping cylinder 20 to be moved between two laterally adjacent vertical walls, which are connected with the housing 12. The choke device 42 may in principle also be arranged in the damping piston 38 or in the cylinder cover 41. In the case of an arrangement in the cylinder cover 41 air is drawn in from outside through the choke device 42 into the cylinder space 32 when there is a damping movement.

Furthermore it is also possible in principle to cause the return movement of the setting piston 13 by vacuum on the screw closure 25 or by an opposite pressure on the opposite side of the setting piston 13 rather than by using a helical spring 14 for this purpose.

Figure 2:
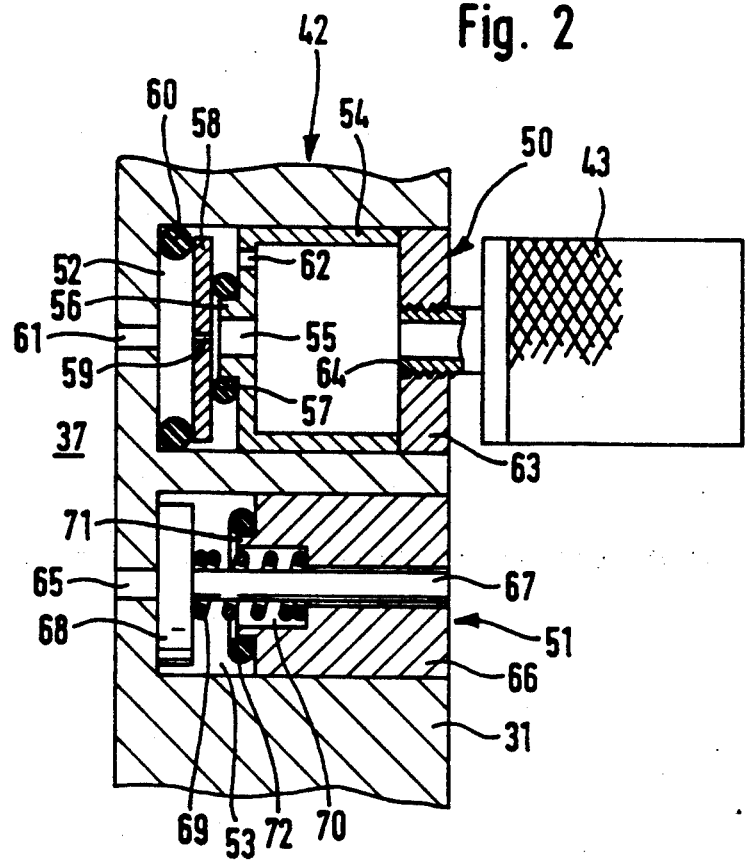
FIG. 2 shows a specific design of the choke device with two chokes connected in parallel.

FIG. 2 shows a specific design of the choke device 42 in the form of an example. The choke device 42 consists in this case of two parallel-connected chokes 50 and 51, which are set in cylindrical recesses 52 and 53 in the right end wall 31 of the damping cylinder 20

The first choke 50 consists of a pot-like choke part which is pressed, screwed, bonded or the like into the cylindrical recess 52, the floor of the pot adjacent to the cylinder space 37 having a central through opening 55 which is surrounded by a pipe member 56. Around the pipe member there is a projecting O-ring seal 57. One choke disk 58 with a small central opening 59 is held sealingly between the O-ring seal 57 and an oppositely arranged O-ring seal 60, which is arranged on the floor of the cylindrical recess 52. A through passage 61 connects the cylinder space 37 with the cylindrical recess 52. To the side in the floor of the pot-like choke part 54 there is a through opening 62. The pot-like choke part 54 is shut off by a cover plate 63, which has a central screw-in opening 64 to receive the silencer 43.

In the second cylindrical recess 53, which is connected with the cylinder space 37 by the intermediary of a passage duct 65, a guide part 66 for the piston rod 67 of a piston-like part 68 is fitted. The piston-like part 68 bears against the guide part 66 with a helical spring 69 between them and it extends into a retainer recess 70 in the guide part 66. The piston-like part 68 consequently bears against the floor of the cylindrical recess 53 and shuts off the passage duct 65. A pipe member 71 fitting around the retainer recess 70 bears an O-ring seal 72.

The manner of operation of the choke device illustrated in FIG. 2 resides essentially in that owing to the two chokes 50 and 51 there is an automatic adaptation to the workpieces 47 with different masses and different speeds of travel.

If a workpiece 47 with a large mass and/or traveling at a high speed strikes the abutment member 40, there will be powerful surge acting on the choke device 42, such surge pressing the choke disk 58 against the O-ring seal 57 so that the same is compressed. Therefore the sealing action between the O-ring seal 60 and the choke disk 58 is interrupted and the escaping air can flow past the choke disk 58 through the passage opening 62 to the silencer 43 and, respectively, into the outside atmosphere. The first pressure surge is consequently compensated for by a brief reduction in the damping action. After the first pressure surge the O-ring seal 57 urges the choke disk 58 back against the O-ring seal 60 so that the escaping air is only able to emerge through the central choke opening 59. Therefore there is an increase in the resistance to flow and the damping action is increased as well.

The effect of a strong pressure surge on the choke 51 is that the piston-like part 68 is moved against the force of the helical spring 69 towards the O-ring seal 72 and by dint of the latter shuts off the passage for the air. If the pressure or force load is then reduced, for instance owing to having a lighter workpiece 47 moving at lower speed, the piston-like part 68 will again be pressed away by the spring 69 from the O-ring seal 72 and the can flow on the outside past the piston-like part 68 through gaps between the piston rod 67 and the guide part 66 to the outside. The second choke 51 has the effect that in the case of a weak loading effect the damping action is attenuated in order to reduce the time expiring before the terminal abutment position is reached.

Figure 3:
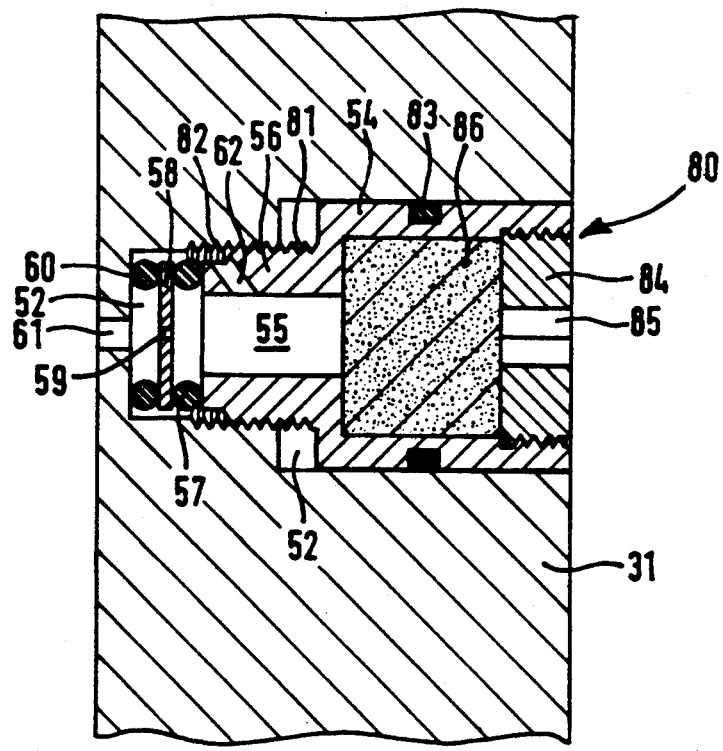
FIG. 3 shows a further specific design of an adjustable choke device.

A choke representing a modification of the choke of FIG. 2 is illustrated in FIG. 3. In contradistinction to the choke 50 the choke properties of the choke 80 may be adjusted from the outside. Like parts are denoted by like reference characters and are not described again.

Unlike the choke 50 in the case of the choke 80 the pipe member 56 is made longer and is provided with an external screw thread 81, the cylindrical recess 52 in the right side wall 31 being stepped in order to receive the choke 80. The part directed towards the passage duct 61 of the cylindrical recess 52 with a smaller diameter has a screw thread 82, into which the pipe member 56 may be screwed. The O-ring seal 57 is in this case arranged in front of the pipe member 56 and has essentially the same dimensions as the O-ring seal 60. In the outer periphery of the pot-like choke part 54 an O-ring seal 83 is set in a suitable groove and it functions to provide a sealing action with respect to the part of the cylindrical recess 52 with the larger diameter. The pot-like choke part 54 is shut off on its end surface facing away from the pipe member 56 by a screw cover 84, which in its center has a recess 85 to receive a wrench. The screw cover 84 is so firmly screwed into the pot-like choke part 54 that on turning a wrench inserted into the recess 85 the complete pot-like part 54 is turned. For this purpose it is possible for the screw cover 84 to be locked by peening, bonding, caulking or the like. In the inner cavity of the pot-like choke part 54 there is a silencer 86, that is to say silencing, fiber-like material. The pot-like choke part 54 is so dimensioned that it is essentially aligned with the outer side of the right end surface 31 and does not project.

It is obviously possible for the silencer to be integrated in the choke 50 in accordance with FIG. 2, that is to say integrated therein.

The manner of operation of the choke 80 illustrated in FIG. 3 is essentially the same as the manner of operation of the choke 50. Owing to the pipe member 56, which is able to be screwed inwards and outwards by means of a wrench inserted into the recess 85 it is possible for the pressing action of the O-ring seals 57 and 60 against the choke disk 58 and, respectively, the pipe member 56 to be adjusted so that it is only in the case of a high pressure of the air escaping through the passage duct 61 during the damping movement that the passage to the passage opening 62 is freed with a compression of the O-ring seal 57. On screwing in the pot-like choke part 54 there is hence an increase in the choke resistance and accordingly a reduction takes place on adjustment on screwing it outwards. This means that an adaptation is possible to suit different ranges of masses to be damped or retarded.

Figure 4:
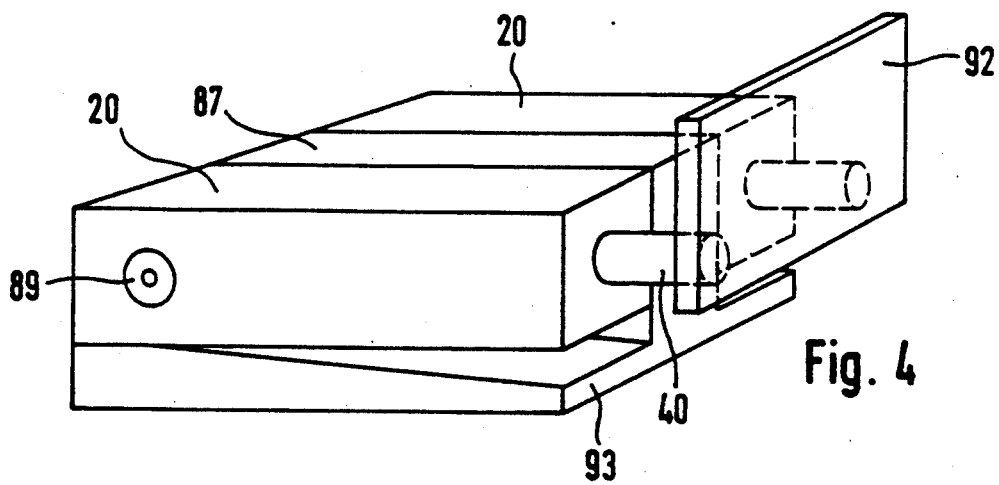
FIG. 4 shows a second working embodiment in a perspective view.
Figure 5:
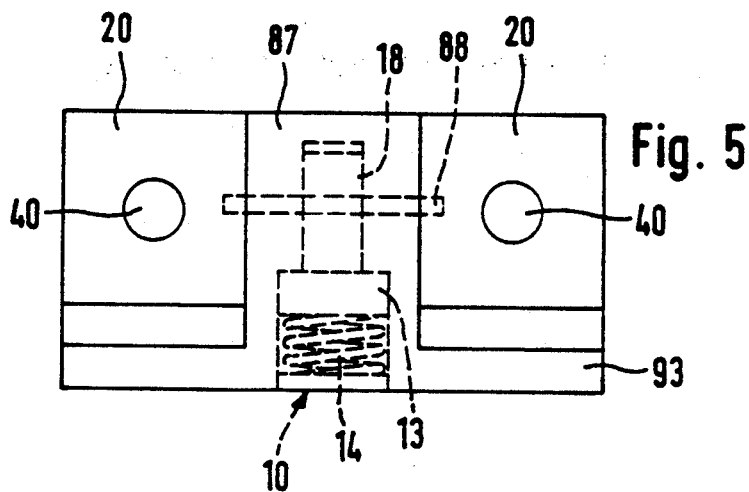
FIG. 5 shows a front view of the second working embodiment of the invention.
Figure 6:
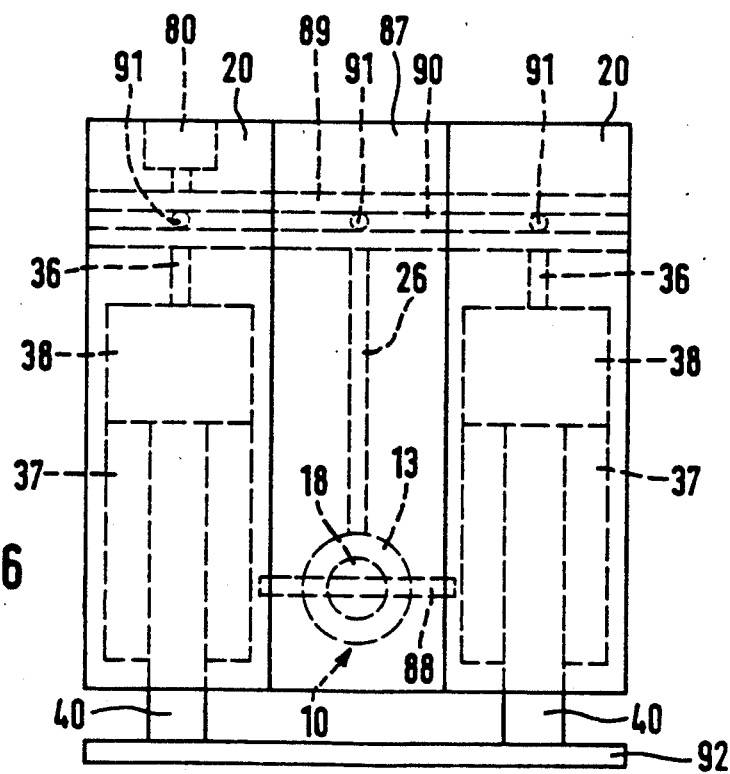
FIG. 6 shows a plan view of the second working embodiment.

In the case of the second embodiment of the invention illustrated in FIGS. 4 through 6 two damping cylinders 20 are pivotally arranged either side of a housing 87 with a rectangular cross section. The housing 87 widens in a downward direction to constitute a foot 93 underneath the damping cylinders 20. This foot is lower in height in the front abutment zone than in the rear zone so that on pivoting the damping cylinders 20 downwards the foot constitutes an abutment. In the front zone of the housing 87 the setting member 10 is arranged which essentially corresponds to the setting member 10 in accordance with FIG. 1 and consequently will not be described in detail again. Unlike the case of FIG. 1 a driving rod 88 extends transversely through the piston rod 18 and has its end parts fitting into the respective damping cylinders 20. Therefore the two damping cylinders 20 are pivoted downwards by means of this driving rod 88 when the piston 13 is subjected to pressure.

A pivot bearing shaft 89 extends transversely through the rear part of the damping cylinders 20 and of the housing 87. This pivoting bearing shaft 89 is in the form of a pressure duct, the pressure duct 26 coming from the setting member 10 opening into the center part of the pivoting bearing shaft 89, while the pressure ducts 36 extend centrally and axially through the damping cylinders 20 and the cylinder spaces 37 are connected thereby with the pivot bearing shaft 89. The pivot bearing shaft 89 has for this purpose an axially extending duct 90, which is connected at the connection points via radially extending holes with the outside. In the vicinity of these radial holes 91 conventional annular ducts are provided, which are not illustrated in order to simplify the drawings. Furthermore the drawings do not show seals which are necessary for sealing off bearing means for the pivot bearing shaft 89 in the housing 87 and in the damping cylinders 20. The axial duct 90 is also shut off in a sealing manner at its outer ends. The drawings have also been simplified by omitting the check valve 33. Such a check valve 33 may obviously be provided in an analogous manner. The left annular hole 91 in the pivoting bearing shaft 89 is connected with the choke 80 in the rear zone of the left damping cylinder 20. Furthermore it is obviously possible for the choke device 42 to be provided here as well.

The two abutment members 40 in the form of piston rods of the damping pistons 38 are connected with each other by the intermediary of an abutment plate 92 which extends in the illustrated neutral position upwards past the damping cylinders 20 and functions as an abutment for the arriving workpieces, palettes, skids and the like. In the illustrated condition of the damping cylinders 20 the abutment plate 92 makes room for the objects positioned at the abutment.

Figure 7:
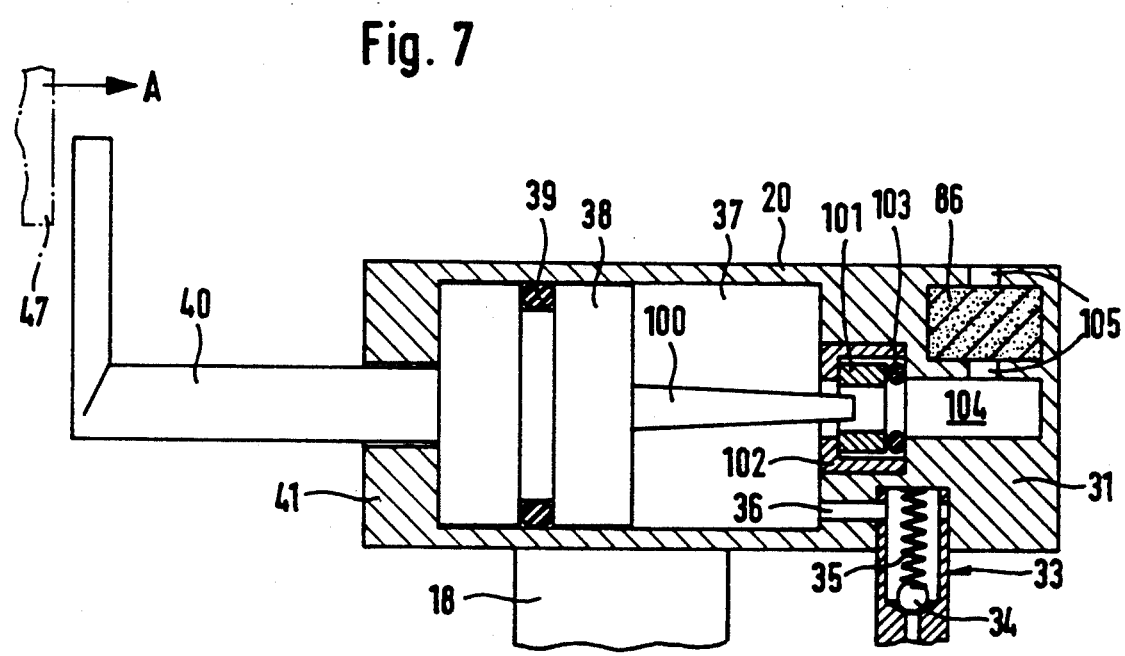
FIG. 7 illustrates a third possible form of the invention.

The damping cylinder 20 illustrated in FIG. 7 is generally the same as the damping cylinder 20 illustrated in FIG. 1 so that like parts are denoted by like reference characters and are not described a second time. A corresponding setting member 10 is obviously also provided but it is not illustrated in order to simplify the drawings.

In the case of the damping cylinder 20 illustrated in FIG. 7 the damping piston 38 is provided with a choke plunger 100 on the end thereof opposite to the abutment member 40, the longitudinal axis of such plunger being in alignment with the longitudinal axis of the damping cylinder 20. In the illustrated left abutment position of the damping cylinder 38 the choke plunger 100 extends a small amount into a choke opening of a cylindrical hole element 101 or aperture plate, which is maintained with radial play in a sleeve 102 with a cylindrical inner space. The sleeve 102 is fitted in a corresponding recess in the right end wall 31 or is secured in some other way. For sealing an O-ring seal 103 is utilized which is positioned between the end side, facing away from the damping piston 38, of the hole element 101 and a stage in the right end wall surface 31. An exit duct 104 extends from the recess receiving the sleeve 102 in an axial direction through the right end wall 31, into which the piston plunger 100 moves when the piston is moved. From this outlet duct 104 there extends a lateral outlet duct 105 to the outer side of the damping cylinder 20, this lateral outlet duct 105 having the silencer 86 integrated in it in the right outer wall.

The outlet orifice is predetermined by the gap between the choke plunger 100 and the inner wall surface of the hole element 101. The cross section of the choke plunger 100 increases towards the damping piston 38 so that in the case of a damping movement the damping resistance at the end of the damping movement becomes larger and larger. As a result it is possible from the damping properties to be optimized according to damping displacement. Dependent on the particular application it is possible to select any desired cross section for the choke plunger 100.

Since the choke cross section, that is to say the gap between the choke plunger 100 and the hole element, may amount to only a few 1/100 mm, the hole element 101 is able to be radially moved in order to allow for guiding play Furthermore in principle it is possible for the pressure duct 36 from the check valve 33 to open into the outlet duct 104 as well. This depends on the amount of space available in a given design. Furthermore it is possible for additional choke elements to be placed in parallel, as is illustrated in FIG. 2 for instance. Lastly the damping cylinder illustrated in FIG. 7 may be utilized in a design as in FIGS. 4 through 6.

We claim:

1. An abutment for damping movement of a workpiece having different masses and traveling at different speeds, said abutment comprising;
   a setting member mountable on a base machine,
   at least one damping device having a damping piston movable in a damping cylinder,
   a choke device engaged to said at least one damping device providing resistance to flow of air leaving and entering said damping cylinder when said damping piston is moved,
   an abutment member engaged to said damping piston and movable by said workpiece from a first abutment position to a second end abutment position,
   said at least one damping device moveably engaged on said setting member,
   actuating means associated with said setting member for moving said at least one damping device and abutment member in a direction perpendicular to a longitudinal axis of said at least one damping device out of a plane of abutment and back into said plane of abutment, and
   return means for return of said abutment member from said end abutment position into said first abutment position.

2. The abutment as claimed in claim 1, comprising at least two damping devices connected in parallel with each other.

3. The abutment as claimed in claim 2, wherein said at least two damping devices are arranged pivotally on both sides of a housing containing said setting member.

4. The abutment as claimed in claim 3, wherein a connection element is arranged transversely in relation to the direction of movement of a setting piston and has two end parts respectively extending into each of said damping devices.

5. The abutment as claimed in claim 3, wherein a pivot bearing shaft for said at least two damping devices has a pressure duct.

6. The abutment as claimed in claim 1, wherein said return means is constituted by a fluid power pressure duct opening into said damping cylinder to return said damping piston when there is a pressure surge.

7. The abutment as claimed in claim 6, wherein said setting member has a setting piston which is arranged in a cylinder space in a housing and is able to be moved by fluid power, and which is connected with said damping cylinder by an intermediary connection element and said setting piston is constituted by a control for said fluid power pressure duct.

8. The abutment as claimed in claim 7, wherein said actuating means comprises a return spring and said fluid power.

9. The abutment as claimed in claim 7, wherein said fluid power pressure duct opens into a side of said cylinder space and at least partly runs through said housing and between said housing and said damping cylinder.

10. The abutment as claimed in claim 9, wherein said fluid power pressure duct comprises a piston part on said damping cylinder which fits in a sliding and sealing manner in a cylinder recess in said housing.

11. The abutment as claimed in claim 10, wherein a check valve is arranged in said piston part on said damping cylinder.

12. The abutment as claimed in claim 9, wherein a portion of said fluid power pressure duct between said housing and said dumping cylinder is flexible.

13. The abutment as claimed in claim 9, wherein said fluid power pressure duct comprises a piston part on said housing which fits in a sliding and sealing manner in a cylinder recess in said damping cylinder.

14. The abutment as claimed in claim 13, wherein a check valve is arranged in said piston part on said housing.

15. The abutment as claimed in claim 6, comprising a check valve in said fluid power pressure duct allowing passage of fluid to said damping cylinder.

16. The abutment as claimed in claim 1, wherein said choke device is arranged in an end part of said damping cylinder against which said damping piston rests in said end abutment position thereof.

17. The abutment as claimed in claim 16, wherein said damping piston is provided with a choke plunger extending in an axial direction to fit into a choke opening in an end part of the damping cylinder against which said damping piston abuts in said end abutment position thereof.

18. The abutment as claimed in claim 17, wherein said choke plunger varies in a cross section along a length.

19. The abutment as claimed in claim 18, wherein said cross section of said choke plunger increases towards said damping piston.

20. The abutment as claimed in claim 17, wherein said choke opening is arranged in a radially moving hole element.

21. The abutment as claimed in claim 20, wherein said radially moving hole element is arranged sealingly in a chamber with a larger internal diameter than said hole element.

22. The abutment as claimed in claim 17, wherein said end part of said damping cylinder has an outlet duct receiving said choke plunger.

23. The abutment as claimed in claim 1, wherein said choke device has different choke apertures and means for changing between said different choke apertures in response to changes in pressure.

24. The abutment as claimed in claim 23, wherein said choke device comprises a first choke having a first choke opening, said choke device has a second larger choke aperture opening as a bypass for a short time during a pressure surge.

25. The abutment as claimed in claim 24, wherein in a passage through said first choke a choke element is provided, which has said first choke opening, said choke element being arranged between a first elastic seal and a second elastic seal and having a smaller external diameter than said passage, a by-pass passage is provided outside said first elastic seal remote from said damping piston, said first elastic seal being deformable by a pressure surge to override a sealing connection between said choke element and said second elastic seal.

26. The abutment as claimed in claim 25, wherein said choke element has a form of an aperture plate.

27. The abutment as claimed in claim 25, wherein said first choke has a setting element screwable inwards and outwards to vary an axial play between said first elastic seal, said second elastic seal and said screwable choke element.

28. The abutment as claimed in claim 23, wherein said choke device comprises a second choke which is connected in parallel to reduce a choking action at a small pressure load.

29. The abutment as claimed in claim 28, wherein said second choke comprises a choke element which moves in response to a pressure in said damping cylinder and moves against a force of a spring while running in a cylinder, said choke element being under maximum spring tension and at an ultimate end position when sealing off an opening in a choke passage, said choke element having a diameter smaller than a diameter of said cylinder.

30. The abutment as claimed in claim 1, wherein the outlet of said choke device is provided with a silencer.

31. The abutment as claimed in claim 30, wherein said silencer is integrated in said choke device.

32. The abutment as claimed in claim 30, wherein said silencer is integrated in a wall of said damping cylinder.

33. The abutment as claimed in claim 1, comprising said damping cylinder at least one sensor for detecting said end abutment position of said abutment member and.

34. The abutment as claimed in claim 1 comprising on said damping cylinder at least one sensor for detecting a position of a passing workpiece.

* * * * *